United States Patent
Lee et al.

(10) Patent No.: US 9,686,699 B2
(45) Date of Patent: Jun. 20, 2017

(54) METHOD AND APPARATUS FOR ESTIMATING AVAILABLE BANDWIDTH FOR EACH USER EQUIPMENT IN MOBILE COMMUNICATION SYSTEM

(71) Applicant: Samsung Electronics Co., Ltd., Gyeonggi-do (KR)

(72) Inventors: Chul-Ki Lee, Seoul (KR); Sang-Jun Moon, Seoul (KR); Yong-Seok Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 108 days.

(21) Appl. No.: 14/355,714

(22) PCT Filed: Nov. 1, 2012

(86) PCT No.: PCT/KR2012/009137
§ 371 (c)(1),
(2) Date: May 1, 2014

(87) PCT Pub. No.: WO2013/066082
PCT Pub. Date: May 10, 2013

(65) Prior Publication Data
US 2014/0293823 A1   Oct. 2, 2014

(30) Foreign Application Priority Data
Nov. 1, 2011   (KR) .................. 10-2011-0112661

(51) Int. Cl.
*H04W 72/04* (2009.01)
*H04W 24/08* (2009.01)
(Continued)

(52) U.S. Cl.
CPC ........ *H04W 24/08* (2013.01); *H04N 21/2385* (2013.01); *H04N 21/4126* (2013.01);
(Continued)

(58) Field of Classification Search
CPC ..... H04L 1/0026; H04L 5/001; H04L 1/0027; H04L 5/0057; H04L 5/0055; H04B 7/0417; H04B 7/0632
(Continued)

(56) References Cited

U.S. PATENT DOCUMENTS 9,143,218 B2 * 9/2015 Etkin .................. H04L 25/0206
2004/0139150 A1   7/2004 McCanne et al.
(Continued)

FOREIGN PATENT DOCUMENTS

DE   WO 2010086156 A1 *  8/2010 ........... H04L 1/0007
EP   2 378 686       10/2011
(Continued)

OTHER PUBLICATIONS

European Search Report dated May 27, 2015 issued in counterpart application No. 12846639.8-1857.
(Continued)

*Primary Examiner* — Sai Aung
(74) *Attorney, Agent, or Firm* — The Farrell Law Firm, P.C.

(57) ABSTRACT

A method for estimating an available bandwidth for each User Equipment (UE) in a mobile communication system comprises: a process of receiving estimated bandwidth information for at least one UE from an enhanced node B; a process of checking whether the estimated bandwidth information is received from a Medium Access Control (MAC) layer constituting said enhanced node B, or received through a Radio Link Control (RLC) layer or a Packet Data Control Protocol (PDCP) layer; a process of updating channel quality information using said estimated bandwidth information if it is checked that said estimated bandwidth information is received through the MAC layer; a process of updating an average value weighted with respect to the
(Continued)

number of bytes of the bandwidth served by said enhanced node B using the estimated bandwidth information if it is checked that said estimated bandwidth information is received through the RLC or PDCP layer; and a process of calculating the bandwidth currently available by at least one UE using the updated channel quality information or the average value weighted with respect to the number of the bytes of the served bandwidth, and then transmitting the calculated bandwidth to a server.

11 Claims, 5 Drawing Sheets

(51) Int. Cl.
   *H04W 80/02* (2009.01)
   *H04N 21/2385* (2011.01)
   *H04N 21/6373* (2011.01)
   *H04N 21/41* (2011.01)
   *H04W 72/00* (2009.01)

(52) U.S. Cl.
   CPC ........ *H04N 21/6373* (2013.01); *H04W 72/00* (2013.01); *H04W 80/02* (2013.01)

(58) Field of Classification Search
   USPC .................................. 370/252, 328, 329
   See application file for complete search history.

(56) References Cited

U.S. PATENT DOCUMENTS

| | | | |
|---|---|---|---|
| 2007/0077952 A1 | 4/2007 | Sartori et al. | |
| 2007/0121547 A1 | 5/2007 | Huh et al. | |
| 2007/0147249 A1 | 6/2007 | Kumar | |
| 2009/0161545 A1 | 6/2009 | Ho et al. | |
| 2009/0232158 A1* | 9/2009 | Frank | H04W 8/30 370/466 |
| 2010/0041430 A1* | 2/2010 | Ishii | H04L 5/0075 455/522 |
| 2010/0135212 A1* | 6/2010 | Ho | H04W 28/065 370/328 |
| 2010/0238824 A1* | 9/2010 | Farajidana | H04B 7/0417 370/252 |
| 2012/0099553 A1* | 4/2012 | Aiba | H04L 5/001 370/329 |
| 2012/0176965 A1* | 7/2012 | Zhu | H04B 7/0689 370/328 |
| 2012/0320783 A1* | 12/2012 | Wu | H04B 7/0689 370/252 |
| 2013/0077523 A1* | 3/2013 | Ko | H04W 24/00 370/252 |
| 2013/0182789 A1* | 7/2013 | Ko | H04B 7/0626 375/267 |

FOREIGN PATENT DOCUMENTS

| | | |
|---|---|---|
| KR | 1020020020902 | 3/2002 |
| WO | WO 2009/045882 | 4/2009 |

OTHER PUBLICATIONS

PCT/ISA/237 Written Opinion issued on PCT/KR2012/009137 (pp. 4).

PCT/ISA/210 Search Report issued on PCT/KR2012/009137 (pp. 3).

Jiang, Zhimei et al., Max-Utility Wireless Resource Management for Best-Effort . . . , IEEE Transactions on Wireless Communications, vol. 04, No. 1, Jan. 2005 (pp. 100-111).

\* cited by examiner

METHOD AND APPARATUS FOR ESTIMATING AVAILABLE BANDWIDTH FOR EACH USER EQUIPMENT IN MOBILE COMMUNICATION SYSTEM

TECHNICAL FIELD

The present disclosure relates to a method and an apparatus for estimating a currently available bandwidth for each of user equipment managed by an enhanced Node B in a mobile communication system.

BACKGROUND ART

In a general communication system, each of user equipment (UE) and an enhanced Node B has a protocol stack including a plurality of layers. The plurality of layers includes a Packet Data Control Protocol (PDCP) layer, a Radio Link Control (RLC) layer, a Medium Access Control (MAC) layer, and a physical layer (hereinafter, referred to as 'L1').

The L1 is a layer for providing an information transfer service using a radio transfer technology, and transport channels are connected between the L1 layer and the MAC layer. The transport channels are defined by such a manner that a certain data is processed in the physical layer. The physical layer encodes data by means of a scrambling code assigned to each cell and a channelization code assigned to each physical channel, so that the encoded data may be transmitted wirelessly.

The MAC layer and the RLC layer are connected through a logical channel. The MAC layer transfers data, which the RLC layer transfers through a logical channel, to a physical layer through an appropriate transfer channel, and transfers data, which the physical layer transfers through a transfer channel, to the RLC layer through appropriate logical channels. Further, the MAC layer inserts additional information into the data transferred through the logical channels or the transfer channels, or analyzes the additional information inserted in the data and then performs a suitable operation, so as to control a random access operation.

The RLC layer takes charge of setting and releasing logical channels, and performs a function of dividing or connecting a service data unit received from a superordinate layer into appropriate sizes and a function of correcting an error. The PDCP layer is arranged at a superordinate layer of the RLC layer so as to perform a function of compressing and restoring a header of data transmitted in the form of an Internet Protocol (IP) and a function of transmitting data without a loss in a state that a Radio Network Controller (RNC) providing a service to a certain terminal with a mobility is changed.

In a general adaptive streaming scheme, there is no exchange of information between the MAC layer and the RLC layer of an enhanced node B performing the above-mentioned function. Therefore, the conventional enhanced node B estimates a bandwidth for a service provided to the UE through feedback information received from the UE, and provides the UE with a service, i.e., a video, with a quality corresponding to the estimated bandwidth. As an example, in the case that the enhanced node B provides the UE with a video streaming service, it is assumed that a bandwidth which the UE can use is about 100 kbps. In this case, the enhance node B streams a video of an image quality with a bandwidth of about 100 kbps to the UE. However, as the UE moves in a radio environment, a case that an available bandwidth is reduced by 10 kbps may occur. In this case, since there is no exchange of the information between the MAC layer and the RLC layer of the enhanced node B, the RLC layer cannot detect a change of the available bandwidth of the UE. Thus, the video of the image quality with a bandwidth corresponding to the changed bandwidth cannot be transmitted to the UE.

Further, since the enhanced node B and a conventional server, which is an external host transmitting and receiving a packet data, cannot identify a bandwidth which a corresponding UE can use, a Transmission Control Protocol (TCP) layer transmits a packet corresponding to a predetermined window size to the UE while gradually increasing the window size for a transmission. Accordingly, as the size of the TCP window gradually increases, it takes a certain time to reach an appropriate TCP throughput.

DESCRIPTION OF THE INVENTION

Technical Problems

The present disclosure has been made to solve the above-mentioned problem in the conventional art, and an aspect of the present disclosure is to provide an apparatus and a method for transmitting estimated information on an available bandwidth of a corresponding UE by means of each of an MAC layer, an RLC layer and a PDCP layer, and calculating the available bandwidth based on the estimated information on the transmitted bandwidth.

Another aspect of the present disclosure is to provide an apparatus and a method for transferring an available bandwidth of each UE to a server based on estimated information on the bandwidth provided by each layer of an enhance node B, and controlling a TCP window size and a service quality based on the available bandwidth of each UE.

Means to Solve the Problem

In accordance with an aspect of the present disclosure, a method of estimating an available bandwidth of each User Equipment (UE) in a mobile communication system is provided. The method includes: receiving estimated bandwidth information for at least one UE from an enhanced node B; identifying whether the estimated bandwidth information is received from a Medium Access Control (MAC) layer constituting the enhanced node B, or through a Radio Link Control (RLC) layer or a Packet Data Control Protocol (PDCP) layer; updating channel quality information by using the estimated bandwidth information if the estimated bandwidth information is received through the MAC layer as a result; updating a weighted average value for a number of bytes of the bandwidth served by the enhanced node B by using the estimated bandwidth information if the estimated bandwidth information is received through the RLC or PDCP layer; and calculating a currently available bandwidth of the at least one UE by using the weighted average value for the updated channel quality information or the number of the bytes of the served bandwidth, and then transmitting information on the available bandwidth to a server.

In accordance with another aspect of the present disclosure, a method of using an available bandwidth of each User Equipment (UE) managed by an enhanced node B in a mobile communication system is provided. The method includes: receiving the available bandwidth of each UE; and controlling an amount of streaming services provided to each corresponding UE by using the available bandwidth of each UE, wherein the available bandwidth of each UE is calculated by using channel quality information obtained from a corresponding UE and a weighted average value for a number of bytes of the bandwidth served by the enhanced node B.

In accordance with still another aspect of the present disclosure, an apparatus for estimating an available bandwidth of each User Equipment (UE) in a mobile communication system is provided. The apparatus includes: a receiving unit which receives estimated bandwidth information for at least one UE from an enhanced node B; a bandwidth estimation unit which identifies whether the estimated bandwidth information is received from an MAC layer constituting the enhanced node B, or through a RLC layer or a PDCP layer, updates channel quality information by using the estimated bandwidth information if the estimated bandwidth information is received through the MAC layer as a result of the identification while updating a weighted average value for a number of bytes of a bandwidth served by the enhanced node B by using the estimated bandwidth information if the estimated bandwidth information is received through the RLC layer or the PDCP layer as a result of the identification, and calculating a currently available bandwidth of the at least one UE by using the updated channel quality information or the weighted average value for the number of the bytes of the served bandwidth; and a transmitting unit which transmits the calculated and currently available bandwidth of the at least one UE to a server.

In accordance with still another aspect of the present disclosure, a server for using an available bandwidth of each User Equipment (UE) managed by an enhanced node B in a mobile communication system is provided. The server includes: a receiving unit which receives the available bandwidth of each UE; and a controller which controls an amount of streaming services provided to each corresponding UE by using the available bandwidth of each UE, wherein the available bandwidth of each UE is calculated by using channel quality information obtained from a corresponding UE and a weighted average value for a number of bytes of the bandwidth served by the enhanced node B.

Advantageous Effect

The present disclosure has an advantage in that each of the MAC layer, the RLC layer and the PDCP layer of the enhanced node B transmits the estimated information on the available bandwidth of each UE, the available bandwidth is estimated based on the estimated information on the transmitted bandwidth, and the adaptive streaming service is provided to the corresponding terminal based on the estimated bandwidth. Further, the present disclosure provides the server which is the external host for transmitting and receiving the packet data to/from the enhanced node B, so as to receive the data with the service quality controlled through the TCP window size based on the estimated bandwidth. Accordingly, there is an advantage in that a service suitable for a bandwidth condition of the corresponding UE can be received.

BEST MODE

Mode for the Invention

Hereinafter, an embodiment of the present disclosure will be described in detail with reference to the accompanying drawings. In the following description, it is noted that only structural elements necessary for helping in an operation of the present disclosure will be described, and the description of other elements except for the necessary structural elements will be omitted in order to make the subject matter of the present disclosure clear.

Hereinafter, the present disclosure proposes an apparatus and a method for receiving estimated information on available bandwidth for each layer of the UE, which is transmitted by each of an MAC layer, an RLC layer and a PDCP layer of an enhanced node B, estimating an available bandwidth based on the received and estimated information on the bandwidth, controlling a TCP window size based on the estimated available bandwidth, and providing a corresponding service to User Equipment (UE).

Figure 1:
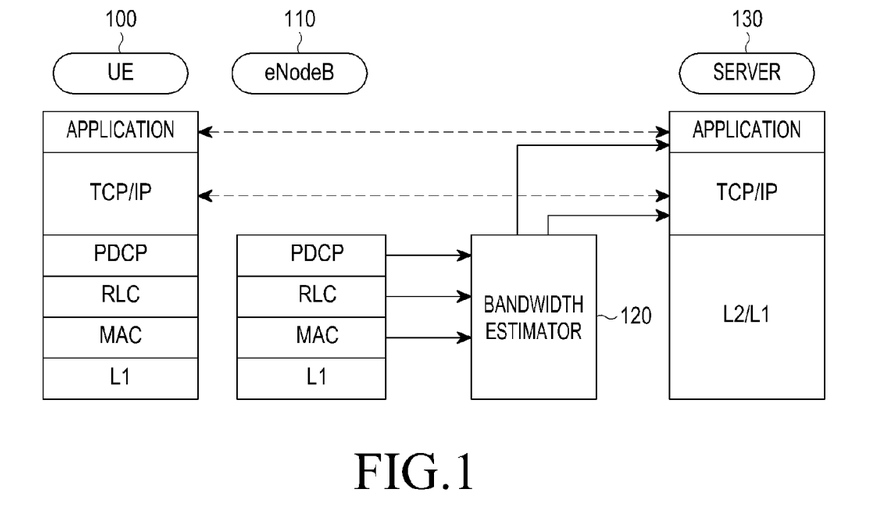
FIG. 1 is a view illustrating a relation between a bandwidth estimator and layers according to an embodiment of the present disclosure.

FIG. 1 is a view illustrating a relation between a bandwidth estimator and layers according to an embodiment of the present disclosure.

Referring to FIG. 1, protocol stacks of each apparatus relating to communication of the UE 100 with a server 130 through the enhance node B 110 are shown. Here, a case that the enhanced node B 110 manages one UE 100 is shown as an example. However, the present disclosure may be applied to a case that the enhanced node B manages a plurality of UEs.

The protocol stacks of the UE 100 are sequentially constituted of an application layer, a TCP/IP layer, a PDCP layer, an RLC layer, an MAC layer and an L1 layer. The protocol stacks of the enhanced node B 110 are constituted of the PDCP layer, the RLC layer, the MAC layer and the L1 layer. The protocol stacks of the server 130 are constituted of the application layer, the TCP/IP layer and the L2/L1 layer.

The RLC and MAC layers of the UE 100 and the RLC and MAC layers of the enhanced node B 110 are used for wireless communication between the UE 100 and the enhanced node B 110. An IP packet received from the server 130 is restored in the PDCP layer of the UE 100, and the restored IP packet is finally transmitted to the server 130 through the enhanced node B 110. The UE 100 and the server 130 perform IP communication in such a manner as mentioned above, and the TCP/IP layer and the application layer of the UE 100 are capable of communicating with the TCP/IP layer and the application layer of the server 130, respectively.

Since information of a subordinate layer is not transmitted to a superordinate layer in general communication schemes, the present disclosure proposes a bandwidth estimator 120 for transferring the information of the subordinate layer to the superordinate layer. The bandwidth estimator 120 obtains estimated bandwidth information of each UE, which is collectable in each of the RLC layer and the MAC layer of the enhanced node B 110, and estimates an available bandwidth of each UE. Also, the bandwidth estimator 120 transfers the available bandwidth information of each estimated UE to the application layer or the TCP/IP layer of the server 130.

In FIG. 1, it is shown that the bandwidth estimator 120 is located at an intermediate node interposed between the enhanced node B 110 and the server 130. However, the location of the bandwidth estimator 120 is merely shown as an example. The bandwidth estimator according to the present disclosure may be present in the enhanced node B or the server.

Particularly, the bandwidth estimator 120 collects the estimated bandwidth information from the MCA layer and the RLC layer. The estimated bandwidth information provided by the MAC layer of the enhanced node B 110 includes wireless channel quality. The estimated bandwidth information provided by the RLC layer or the PDCP layer of the enhanced node B 110 includes an amount of data with which the enhanced node B 110 actually serves a corresponding UE.

Hereinafter, operations of the bandwidth estimator, which are classified into three types, will be described in the embodiment of the present disclosure. A first operation is a process of reporting information (hereinafter, referred to as "estimated bandwidth information"), which is used to estimate the available bandwidth of the corresponding UE from at least one of the MAC layer, the RLC layer and the PDCP layer of the enhanced node B 110, to the bandwidth estimator. A second operation is a process of calculating the available bandwidth of the corresponding UE by using the information which the bandwidth estimator receives through the first operation. Finally, a third operation is a process of utilizing the available bandwidth of the corresponding UE, which the bandwidth estimator calculates. In the embodiment of the present disclosure, a case of utilizing the available bandwidth in the TCP layer and a case of utilizing the available bandwidth when the application layer provides a streaming service are exemplarily illustrated as utilization examples. However, a range in which the estimated available bandwidth of each UE is utilized in the present disclosure is not limited to the above-mentioned cases, and of course, the available bandwidth of each UE may be utilized in various layers of other entities.

Hereinafter, the first operation according to the embodiment of the present disclosure will be described with reference to FIGS. 2 and 3.

Figure 2:
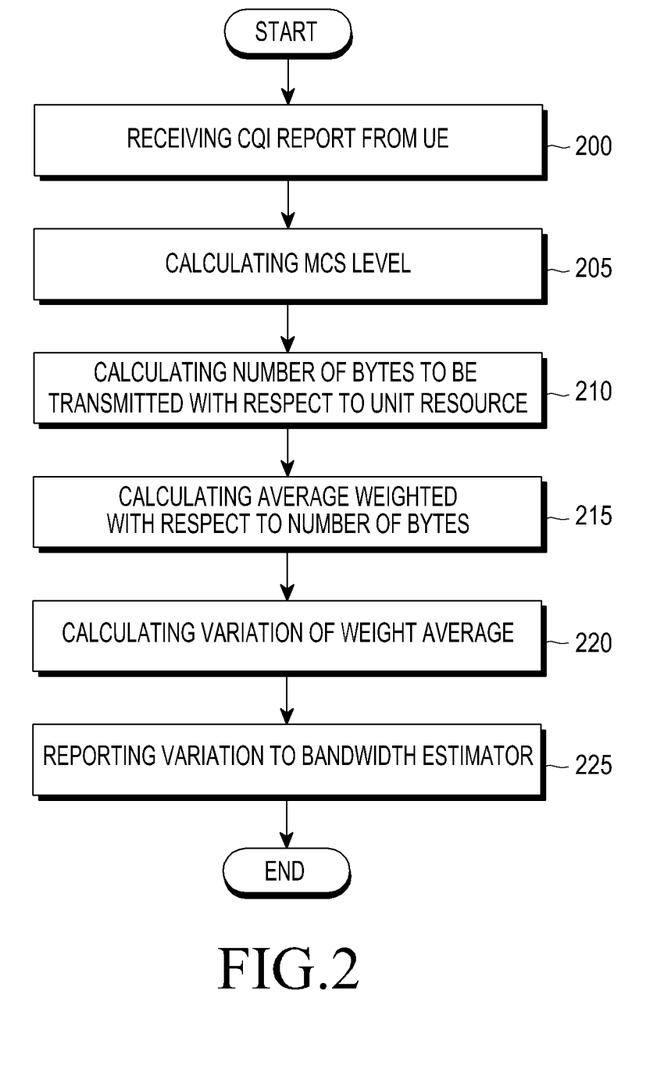
FIG. 2 is a flowchart illustrating a process of reporting estimated bandwidth information in an MAC layer of an enhanced node B according to the embodiment of the present disclosure.

FIG. 2 is a flowchart illustrating a process of reporting estimated bandwidth information in an MAC layer of an enhanced node B according to the embodiment of the present disclosure.

Referring to FIG. 2, in step 200, the MAC layer of the enhanced node B receives a Channel Quality Indication (CQI) report from the UE, and then performs step 205. The MAC layer of the general enhanced node B receives a report of the latest CQI from the UEs which it manages. At this time, when a channel status of the CQI for the corresponding UE reported to the MAC layer is good in comparison with a channel status of the CQI previously reported to the MAC layer, it means that the UE can receive a greater data rate than a present data rate. Further, when the channel status of the CQI for the corresponding UE reported to the MAC layer is bad in comparison with the channel status of the CQI previously reported to the MAC layer, it means that the UE can receive a data rate less than the present data rate.

Therefore, the MAC layer of the enhanced node B compares the present CQI with the previous CQI, and performs step 205 in order to objectively and numerically express a changed value of the present CQI compared with the previous CQI. In step 205, the MAC layer of the enhanced node B calculates a level of a Modulation and Coding Scheme (MCS) corresponding to the received CQI. The MAC layer of the enhanced node B may obtain the MCS level corresponding to the CQI which is received in step 200 through a table in which the MCS of each CQI previously stored is mapped. At this time, as an example, the table may have a range of the corresponding CQI mapped with each MCS level.

In step 210, the MAC layer of the enhanced node B calculates an amount of bytes that a certain radio resource can carry, in order to numerically express the MCS level, and performs step 215. Here, the number of bytes indicating the certain radio resource mapped with each of the previously stored MCS level is obtained.

In step 215, the MAC layer of the enhanced node B calculates a weighted average for the number of the bytes obtained by a unit of the certain radio resource, and performs step 220. The weighted average for the number of the obtained bytes is a value of the present CQI converted into a unit of a byte.

In step 220, the MAC layer of the enhanced node B compares the value of the present CQI converted into a unit of a byte with a value of the previous CQI converted into a unit of a byte, which are calculated through steps 200 to 215, so as to express a variation by percentage (%), and performs step 225.

In step 225, the MAC layer of the enhanced node B transfers the percentage of the calculated variation to the bandwidth estimator as the estimated bandwidth information.

Figure 3:
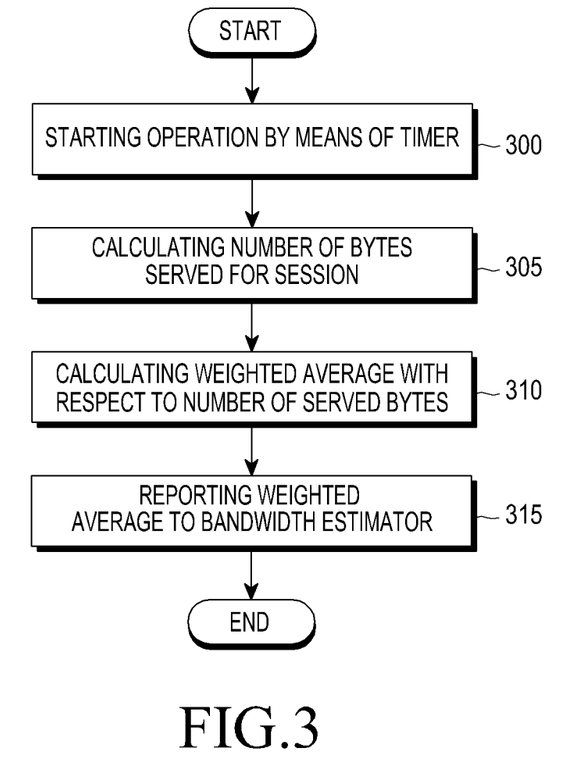
FIG. 3 is a flowchart illustrating a process of reporting estimated bandwidth information in an RLC or a PDCP layer of the enhanced node B according to the embodiment of the present disclosure.

FIG. 3 is a flowchart illustrating a process of reporting estimated bandwidth information in an RLC layer or a PDCP layer of the enhanced node B according to the embodiment of the present disclosure.

Referring to FIG. 3, the RLC layer or the PDCP layer wakes up at a certain interval which is preset in step 300, and then performs step 305. In step 305, the RLC layer or the PDCP layer calculates a bandwidth, i.e., the number of the bytes, which is served in a given session for a corresponding interval, and then performs step 310.

In step 310, the RLC layer or the PDCP layer calculates the weighted average value for the number of the served bytes, and then performs step 315.

In step 315, the RLC layer or the PDCP layer transmits a weighted average value for the number of the served bytes to the bandwidth estimator.

Hereinafter, the second operation according to the embodiment of the present disclosure will be described with reference to FIG. 4.

Figure 4:
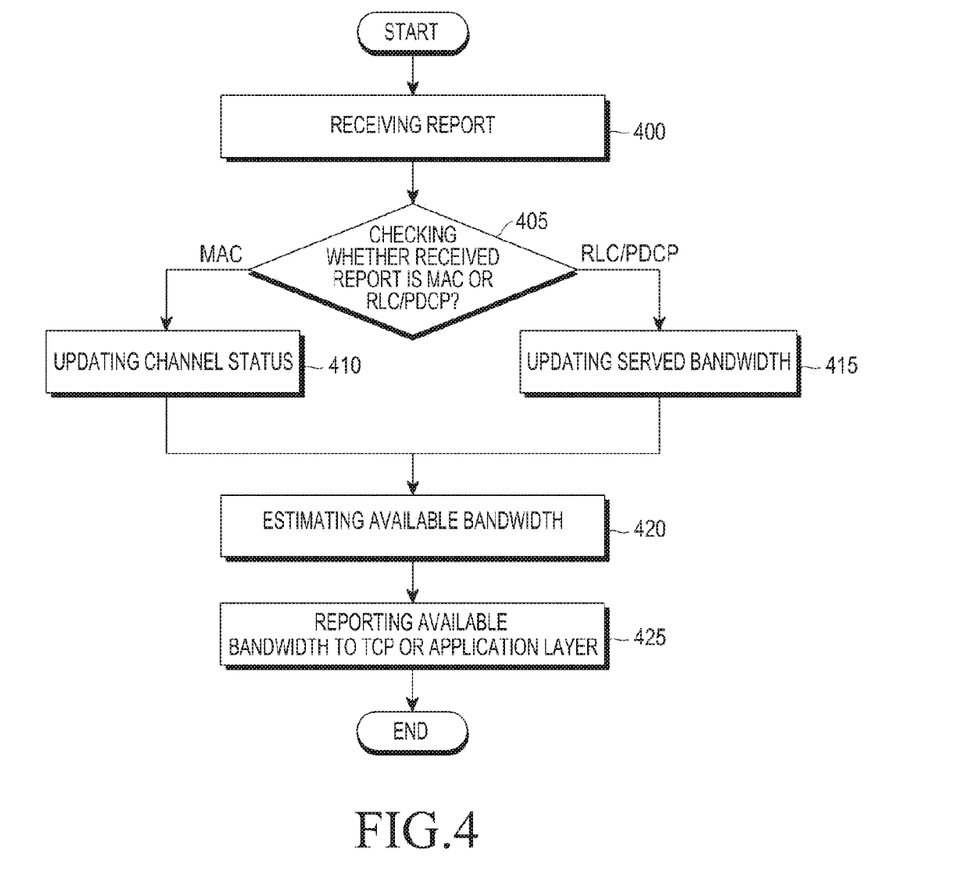
FIG. 4 is a flowchart illustrating an operation of a bandwidth estimator according to the embodiment of the present disclosure.

FIG. 4 is a flowchart illustrating an operation of a bandwidth estimator according to the embodiment of the present disclosure.

Referring to FIG. 4, in step 400, the bandwidth estimator receives the estimated bandwidth information through the MAC layer and/or the RLC/PDCP layer of the enhanced node B, and performs step 405.

In step 405, the bandwidth estimator identifies a layer which transmits the estimated bandwidth information. As a result of the identification, if the layer which transmits the estimated bandwidth information is the MAC layer of the enhanced node B, the bandwidth estimator updates a parameter related to the channel status through the percentage of the variation of the CQI received as the estimated bandwidth information, and then performs step 420. As a result of the identification, if the layer which transmits the estimated bandwidth information is the RLC layer or the PDCP layer of the enhanced node B, the bandwidth estimator updates the weighted average value for the number of the bytes of the served bandwidth received as the estimated bandwidth information, and then performs step 420.

In step 420, the bandwidth estimator estimates the available bandwidth of the corresponding UE by using Equation (1), and then performs step 425.

$$\text{Available bandwidth} = \alpha * \text{percentage of CQI variation} + \text{weighted average value for number of bytes of served bandwidth} \quad \text{Equation (1)}$$

Herein, $\alpha$ is a value used for converting the percentage of a variation of the CQI into the weighted average value for the number of the bytes indicating the certain radio resource mapped according to each MCS level.

In step 425, the bandwidth estimator transfers information on the available bandwidth of the corresponding UE estimated through Equation 1. Accordingly, the information on the available bandwidth of the estimated corresponding UE is transferred to the TCP layer or the application layer of the server.

In the embodiment of FIG. 4, it is illustrated that one of the operations in steps 410 and 415 is performed according to the layer which transmits the estimated bandwidth information. However, when both the MAC layer and the RLC/PDCP layer transfer the estimated bandwidth information, steps 410 and 415 may be performed in parallel.

Hereinafter, the third operation according to the embodiment of the present disclosure will be described with reference to FIG. 5.

Figure 5:
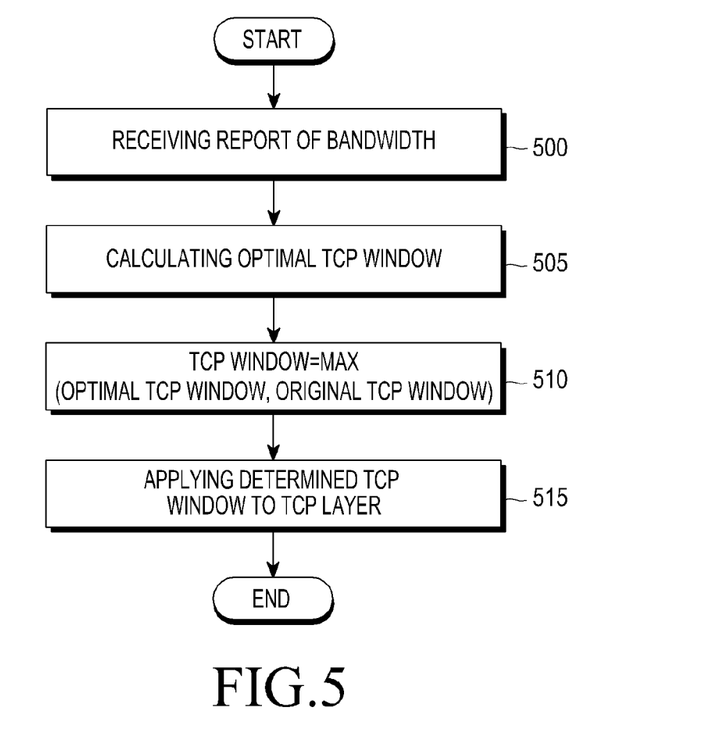
FIG. 5 is a flowchart illustrating an example of a process of utilizing an available bandwidth of the estimated corresponding UE according to the embodiment of the present disclosure.

FIG. 5 is a flowchart illustrating an example of a process of utilizing an available bandwidth of the estimated corresponding UE according to the embodiment of the present disclosure. Herein, an example in which the TCP layer of the server utilizes the available bandwidth of the estimated corresponding UE will be described.

Referring to FIG. 5, in step 500, the TCP layer of the server receives a bandwidth report indicating the information on the available bandwidth of the corresponding UE, and then performs step 505.

In step 505, the TCP layer of the server calculates an optimal TCP window by using Equation (2), and then performs step 510.

$$\text{Optimal TCP window} = \gamma * \text{available bandwidth} * \text{round trip time(roundtrip time)} \quad \text{Equation (2)}$$

Herein, $\gamma$ is a certain constant, and the round trip time is a time at which an ACK signal for a certain TCP packet returns.

As an example, it is assumed that the available bandwidth is 20 Mbps and the round trip time is 30 ms in Equation (2). In this case, an optimal TCP window value according to Equation (2) equals 20 Mbps*30 ms*certain constant.

In step 510, the TCP layer of the server sets a larger one of the optimal TCP window calculated through Equation (2) and a TCP window (hereinafter, referred to as 'original window') calculated by a conventional scheme as the TCP window of the corresponding UE, and then performs step 515.

In step 515, the TCP layer of the server transfers data to the UE by using the set TCP window.

As a result, the TCP layer is capable of wirelessly transmitting larger data than the estimated optimal TCP window to the UE, thereby optimally utilizing the available bandwidth. Further, in the conventional scheme in which the window size is controlled in the TCP layer, an operation of reducing the corresponding TCP window size is performed each time when a packet loss occurs. This operation is prepared for a case that traffic congestion is caused, and has a disadvantage in that it is performed regardless of whether actual congestion occurs.

Since the TCP layer according to the embodiment of the present disclosure accurately knows the available bandwidth which the UE can presently use, however, the optimal TCP window size calculated through Equation (2) may be reduced in circumstances in which the traffic congestion is caused. Thus, when the server recognizes the available bandwidth of the present UE according to the embodiment of the present disclosure, the TCP window size can be efficiently controlled in the traffic congestion circumstances. On the other hand, in the case that not the traffic congestion circumstances but the packet loss simply occurs, there is no substantial change in the magnitude of the currently available bandwidth of the UE, and thereby the optimal TCP window size also is hardly changed.

As a result, the TCP layer of the server which obtains the currently available bandwidth of the corresponding UE according to the embodiment of the present disclosure can provide data corresponding to a more accurate bandwidth to the UE.

Figure 6:
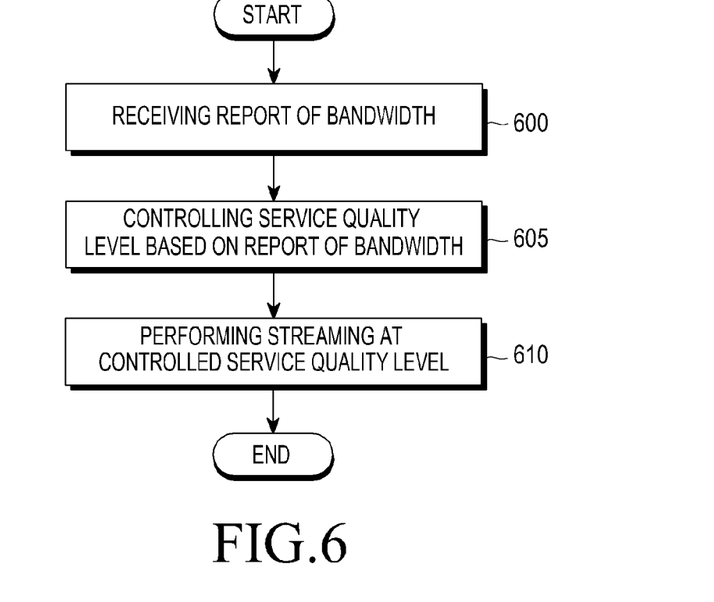
FIG. 6 is a flowchart illustrating another example of the process of utilizing the available bandwidth of the estimated corresponding UE according to the embodiment of the present disclosure.

FIG. 6 is a flowchart illustrating another example of the process of utilizing the available bandwidth of the estimated corresponding UE according to the embodiment of the present disclosure. Herein, an example in which the application layer of the server utilizes the available bandwidth of the estimated corresponding UE will be described.

Referring to FIG. 6, in step 600, the application layer of the server receives a report of the currently available bandwidth of the corresponding UE from the bandwidth estimator, and performs step 605.

In step 605, the application layer of the server controls the UE to have a service quality level with a bandwidth corresponding to the report of the bandwidth for the service currently provided to the UE, and performs step 610. Here, the service currently provided to the UE is a streaming service, and it is assumed that the service corresponds to a video stream or an audio stream.

In step 610, the application layer of the server transfers the streaming service with the adjusted service quality level to the UE.

As described above, the application layer of the server which obtains the available bandwidth of the current UE according to the embodiment of the present disclosure provides the service with the adjusted service quality level to the UE based on the available bandwidth of the current UE. Therefore, there is an advantage in that the UE can be provided with the service suitable for its status.

Although the embodiment has been described in the detailed description of the present disclosure, the present disclosure may be modified in various forms without departing from the scope of the present disclosure. Therefore, the scope of the present disclosure is not limited to the embodi-

The invention claimed is:

1. A method of estimating an available data rate of a user equipment (UE) by an enhanced node B in a mobile communication system, the method comprising:
   obtaining bandwidth information estimated from at least one layer of the enhanced node B, and identifying the obtained bandwidth information;
   when the identified bandwidth information comprises channel quality information, updating a parameter related to a channel status based on variation of the channel quality information, wherein the variation of the channel quality information is obtained from a difference value between the channel quality information and a previous channel quality information;
   when the identified bandwidth information comprises served data rate information, updating an amount of data served by the served data rate information; and
   determining an available data rate of the UE using at least one of the updated parameter and the updated amount of data, and transmitting information on the determined available data rate to a server.

2. An enhanced node B for estimating an available data rate of a user equipment (UE) in a mobile communication system, the enhanced node B comprising:
   a receiving unit configured to obtain bandwidth information estimated from at least one lower layer, and identifying a bandwidth information;
   a controller configured to, when the identified bandwidth information comprises channel quality information, update a parameter related to a channel status based on variation of the channel quality information, wherein the variation of the channel quality information is obtained from a difference value between the channel quality information and a previous channel quality information, when the identified bandwidth information comprises served data rate information, update an amount of data served by the served data rate information, and determine the available data rate of the UE using at least one of the updated parameter and the updated amount of data; and
   a transmitting unit configured to transmit information on the determined available data rate to a server.

3. The method as claimed in claim 1, wherein the available data rate of the UE is used to control an amount of streaming services provided to the UE from the server.

4. The method as claimed in claim 1, wherein the available data rate of the UE is used to control a window size comprising packets to be transmitted to the UE from the server.

5. The method as claimed in claim 4, wherein the window size is determined as a window size having a greater value among a current window size corresponding to the available data rate and a previous window used before transmitting the available data rate from the server.

6. The enhanced node B as claimed in claim 2, wherein the available data rate of the UE is used to control a window size comprising packets to be transmitted to the UE from the server.

7. The enhanced node B as claimed in claim 6, wherein the window size is determined as a window size having a greater value among a current window size corresponding to the available data rate and a previous window size used before transmitting the available data rate from the server.

8. The method as claimed in claim 1, wherein the variation of the channel quality information is obtained using a difference value between a value and a previous average value of the channel quality information,
   wherein the value is obtained by weighting a number of bytes indicating a radio resource mapped to a current modulation and coding scheme (MCS) level of the channel quality information, and the previous average value is obtained by weighting a number of bytes indicating a radio resource mapped to a previous MCS level of a previous channel quality information.

9. The method as claimed in claim 1, wherein the variation of the channel quality information is expressed by a percentage.

10. The enhanced node B as claimed in claim 2, wherein the variation of the channel quality information is obtained using a difference value between a value and a previous average value,
   wherein the value is obtained by weighting a number of bytes indicating a radio resource mapped to a current modulation and coding scheme (MCS) level of the channel quality information, and the previous average value is obtained by weighting a number of bytes indicating a radio resource mapped to a previous MCS level of a previous channel quality information.

11. The enhanced node B as claimed in claim 2, wherein the variation of the channel quality information is expressed by a percentage.

* * * * *